United States Patent
Dedeurwaerder et al.

(10) Patent No.: US 9,597,850 B2
(45) Date of Patent: Mar. 21, 2017

(54) ALIGNMENT OF PLUNGER WITH GEARBOX IN A BALER

(75) Inventors: Bart Dedeurwaerder, Woumen-Diksmuide (BE); Patrick Vandemoortele, Torhout (BE); Rubben Vandevyvere, Diksmuide (BE); Johan Vuylsteke, Gistel (BE)

(73) Assignee: CNH Industrial America LLC, New Holland, PA (US)

( * ) Notice: Subject to any disclaimer, the term of this patent is extended or adjusted under 35 U.S.C. 154(b) by 242 days.

(21) Appl. No.: 13/427,685

(22) Filed: Mar. 22, 2012

(65) Prior Publication Data

US 2012/0240793 A1   Sep. 27, 2012

(30) Foreign Application Priority Data

Mar. 22, 2011 (BE) .................................. 2011/0175

(51) Int. Cl.
*A01F 15/04* (2006.01)
*B30B 15/04* (2006.01)
*B30B 9/30* (2006.01)

(52) U.S. Cl.
CPC .......... *B30B 15/041* (2013.01); *A01F 15/042* (2013.01); *B30B 9/3007* (2013.01); *B30B 9/3021* (2013.01)

(58) Field of Classification Search
CPC ... A01F 15/042; B30B 15/041; B30B 9/3021; B30B 9/3007; Y10T 29/4978; Y10T 29/49778; B23P 19/10
USPC .. 100/3, 4, 35, 177, 178, 179, 188 R, 2, 102
See application file for complete search history.

(56) References Cited

U.S. PATENT DOCUMENTS

| | | | | |
|---|---|---|---|---|
| 2,720,160 A | * | 10/1955 | Tice et al. | 100/98 R |
| 3,059,569 A | * | 10/1962 | Nolt | 100/98 R |
| 3,552,307 A | * | 1/1971 | Venable | 100/98 R |
| 4,135,445 A | | 1/1979 | Smith | |
| 5,363,757 A | * | 11/1994 | Newsom | 100/39 |
| 6,457,405 B1 | * | 10/2002 | Lippens | A01F 15/0825 100/192 |
| 8,959,740 B2 | * | 2/2015 | Bharadwaj | G06F 1/1601 29/33 R |
| 2003/0090682 A1 | * | 5/2003 | Gooch | G01B 11/002 356/620 |

FOREIGN PATENT DOCUMENTS

| | | |
|---|---|---|
| DE | 1151144 | 7/1963 |
| DE | 2109595 | 3/1972 |

OTHER PUBLICATIONS

BE2011/0175 Search Report and Opinion, Nov. 9, 2011.

* cited by examiner

*Primary Examiner* — Jimmy T Nguyen
(74) *Attorney, Agent, or Firm* — Patrick M. Sheldrake

(57) ABSTRACT

A system and method for aligning a compacting plunger of an agricultural square baler with respect to a gearbox for driving the compacting plunger. The method includes controlling a position of plunger rails on and against which the compacting plunger will move when the agricultural square baler is in operation, with respect to a position of a carrying beam adapted for carrying the gearbox. Controlling the position of the plunger rails with respect to the carrying beam adapted for carrying the gearbox rather than with respect to the side walls of the baler provides the advantage of reduced wearing and/or fractures of parts of the baler.

8 Claims, 13 Drawing Sheets

ALIGNMENT OF PLUNGER WITH GEARBOX IN A BALER

This application claims foreign priority benefits to Belgium Application BE2011/0175 filed Mar. 22, 2011 which is incorporated herein by reference in its entirety.

TECHNICAL FIELD

The present invention relates to agricultural balers that produce rectangular bales. Embodiments of the present invention relate more particularly to methods for optimal placement of individual parts to obtain an optimal build of a baler.

BACKGROUND ART

An agricultural baler is a trailed machine (PTM—pulled type machine) which ensures that agricultural material such as hay, straw, silage or similar crop material that previously has been cut, windrowed or swathed, is picked up from the field by a pick-up unit, fed into a duct and loaded into an elongated baling chamber where it is gathered into bales. A plunger which reciprocates in the front portion of the baling chamber compresses the newly introduced material against the previously introduced material into a parallelepipedic package, and at the same time, gradually advances the package towards the outlet of the baling chamber. As the package reaches a predetermined length as determined by a metering device, a knotter device may be actuated to wrap cord, twine or other flexible binding material around the package and to secure the ends of the binding material together to form a stable bale.

FIG. 1 shows an agricultural baler 10 comprising a main frame 11 which is equipped with a forwardly extending tongue 12 provided at its front end with hitch means (not shown) for coupling the baler 10 to a towing tractor. A pick-up assembly 13 lifts windrowed crop material off the field as the baler 10 is travelled thereover and delivers such material into the front end of a rearwardly and upwardly curved, charge-forming feeder duct 14. The duct 14 communicates at its upper end with an overhead, fore-and-aft extending baling chamber 15 into which crop charges are loaded by a cyclically operating stuffer mechanism 16. A continuously operating packer mechanism 17 at the lower front end of the feeder duct 14 continuously feeds and packs material into the duct 14 as to cause charges of the crop material to take on and assume the internal configuration of the duct 14 prior to periodic engagement by the stuffer 16 and insertion up into the baling chamber 15. The feeder duct 14 may be equipped with means (not illustrated) for establishing whether a complete charge has been formed therein and operating the stuffer mechanism 16 in response thereto. Each action of the stuffer mechanism 16 introduces a "charge" or "flake" of crop material from the duct 14 into the chamber 15.

A plunger 18 reciprocates in a fore-and-aft direction within the baling chamber 15 under action of a pair of connecting or pitman rods 19 which are linked to the crank arms 20 of a gearbox 21 driven by a transmission shaft 22 which is connected to the PTO shaft of the tractor pulling the agricultural baler 10. The reciprocating plunger 18 pushes each new charge introduced into the baling chamber 15 rearwardly and forms the subsequent charges into a parallelepiped package of crop material, which is forced by the same action of the plunger 18 toward a rearmost discharge aperture 23 of the chamber 15.

The gearbox 21 is affixed at its lower section by a set of bolts 26 to the main frame 11.

Theoretically, the gearbox 21 is positioned in the middle of the carrying beam 30, and the baling chamber 15 is placed in line with the carrying beam, such that the plunger 18 is placed in line with the gearbox 21. However, some aberrations within tolerance limits can occur when constructing the main frame 11, which may be done most often for example by welding. As a result the gearbox 21 for driving the plunger 18 and the plunger 18 itself might not be completely aligned. Since high forces of the plunger 18 are demanded by the market (currently up to 230 kN and probably this will rise in the future) a non-perfect alignment of plunger 18 and main frame 11 might result in abnormally fast wearing or even in fractures of parts of the baler 10.

One way to overcome the aberrations of the frame 11 is to guide the plunger 18 by rails, for example a set of bottom and top plunger rails 41, 42 at each side of the plunger 18. A typically used method to mount these rails is to align one rail or one set of rails with a side wall of the baling chamber 15 and to mount the other rail or set of rails parallel thereto at a desired distance, determined by a width dimension of the plunger 18. However, if the frame 11 is distorted, the plunger 18 will not be guided in line with the gearbox 21 and wearing will still happen.

SUMMARY OF INVENTION

It is an object of embodiments of the present invention to provide an agricultural baler which overcomes the above-mentioned disadvantage.

The above objective is accomplished by a method and device according to embodiments of the present invention.

In a first aspect, the present invention provides a method for aligning a compacting plunger of an agricultural square baler with respect to a gearbox for driving the compacting plunger. The method comprises controlling a position of plunger rails on and against which the compacting plunger will move when the agricultural square baler is in operation, with respect to a position of a carrying beam adapted for carrying the gearbox. This is different from the prior art, where the position of the plunger rails on and against which the compacting plunger will move when the agricultural baler is in operation is controlled with respect to a sidewall of the baler. Controlling the position of the plunger rails with respect to the carrying beam adapted for carrying the gearbox rather than with respect to the side walls of the baler provides the advantage of reduced wearing and/or fractures of parts of the baler.

The agricultural square baler may comprise a baling chamber for receiving crop material and for having crop material compressed therein, the baling chamber having two chamber walls. In a method according to embodiments of the present invention, controlling a position of plunger rails with respect to a position of a carrying beam may comprise measuring the position of the baling chamber with respect to the carrying beam, and determining rail alignment values for controlling placement of the plunger rails with respect to the chamber walls such that they are positioned in line with a gearbox to be mounted on the carrying beam. The determined rail alignment values may be stored in a first data storage, for example for being used for controlling the position of the plunger rails at a location remote from the location where the measurements have been performed.

A method according to embodiments of the present invention may furthermore comprise controlling placement of the plunger rails in accordance with the determined rail alignment values. Controlling placement of the plunger rails in accordance with the determined rail alignment values may include reading the determined rail alignment values from the first data storage, if they have been stored there previously.

In embodiments of the present invention, controlling the placement of the plunger rails may include making use of at least one sensor device. This may improve the accuracy of the placement control.

A method according to embodiments of the present invention may furthermore comprise, after placement of the plunger rails, determining rail measurement values corresponding to the actual location of the plunger rails with respect to the chamber walls. The rail measurement values may be stored in a second data storage.

In a method according to embodiments of the present invention, the position of the gearbox may be obtained before actually mounting the gearbox.

A method according to embodiments of the present invention may furthermore comprise controlling a position of a knotter system with respect to a position of a carrying beam adapted for carrying the gearbox. Controlling the position of the knotter system with respect to a position of the carrying beam may comprise measuring the position of the baling chamber with respect to the carrying beam, and determining knotter alignment values for controlling placement of the knotter system with respect to the chamber walls such that it is positioned in line with a gearbox to be mounted on the carrying beam.

The above-described method embodiments of the present invention may be implemented in a processing system. Such processing system may include at least one programmable processor coupled to a memory subsystem that includes at least one form of memory, e.g., RAM, ROM, and so forth. It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included but are not described here in detail. The various elements of the processing system may be coupled in various ways, including via a bus subsystem which may for example be a single bus, but will be understood to those in the art to include a system of at least one bus. The memory of the memory subsystem may at some time hold part or all of a set of instructions that when executed on the processing system implement the steps of the method embodiments for aligning a compacting plunger of an agricultural square baler with respect to a gearbox for driving the compacting plunger by controlling a position of plunger rails on and against which the compacting plunger will move. Thus, while a general processing system may be prior art, a system that includes the instructions to implement aspects of the methods for aligning a compacting plunger of an agricultural square baler with respect to a gearbox is not prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium, a machine readable data storage, carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include a CD-ROM, a DVD, a flexible disk or floppy disk, a memory key, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

In one embodiment of a second aspect, the present invention provides the use of a method according to any of the method embodiments of the first aspect for aligning a compacting plunger of an agricultural square baler with respect to a gearbox for driving the compacting plunger.

In another embodiment of the second aspect, the present invention provides the use of a method according to specific embodiments of the first aspect for aligning a knotter system of an agricultural square baler with respect to a gearbox for driving a compacting plunger of that baler.

In a third aspect, the present invention provides an agricultural square baler comprising a frame comprising a carrying beam for carrying a gearbox; a pick-up assembly for picking up crop material from a field; a baling chamber for receiving crop material from said pick-up assembly, the baling chamber comprising two chamber walls which are mounted on the frame; and a compacting plunger mounted for reciprocating movement in said baling chamber for compression of the crop material therein, said plunger being adapted for being driven by a gearbox affixed to said carrying beam, said compacting plunger being adapted for moving on and against plunger rails attached to the chamber walls. The plunger rails are attached to the chamber walls in a controlled position with respect to the carrying beam such that the plunger is adapted to move aligned with respect to the gearbox. This limits wear of and friction between parts of the baler.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Figure 1:
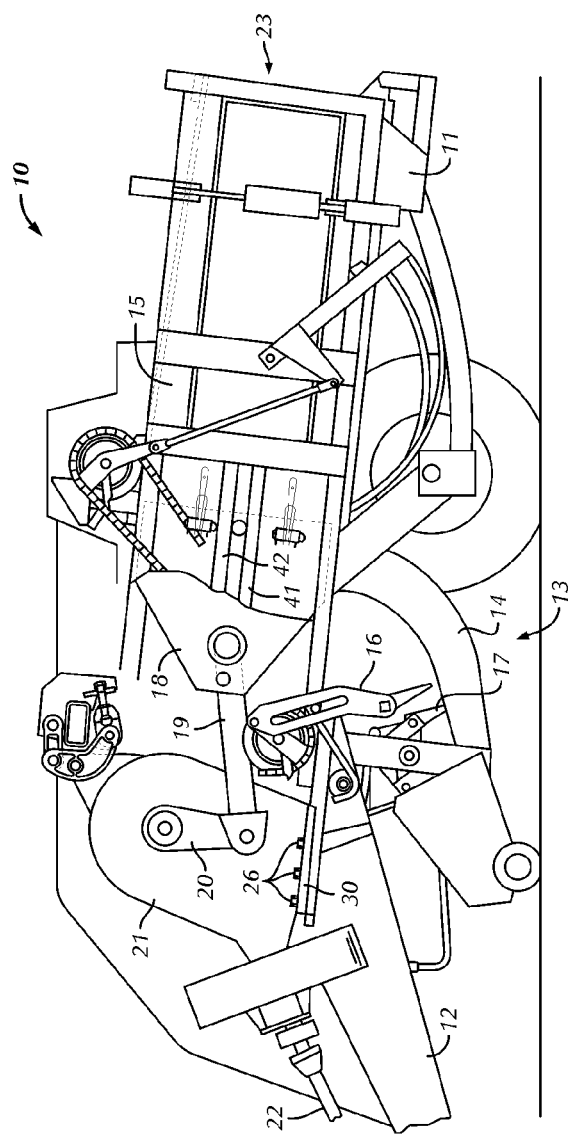
FIG. 1 is a diagrammatical side view of a prior art rectangular baler.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DESCRIPTION OF EMBODIMENTS

The terms "front", "rear", "forward", "rearward", "left" and "right" used throughout this description are determined with respect to the normal direction of travel of the machine in operation. However, they are not to be construed as limiting terms.

Embodiments of the present invention can be used in the construction of agricultural balers for the production of rectangular bales of agricultural material such as hay, straw, silage or similar crop material that previously has been cut, windrowed or swathed, and is picked up from an agricultural field. The produced rectangular bales may have high density, hence a high mass, for example of 500 kg or more.

Figure 2:
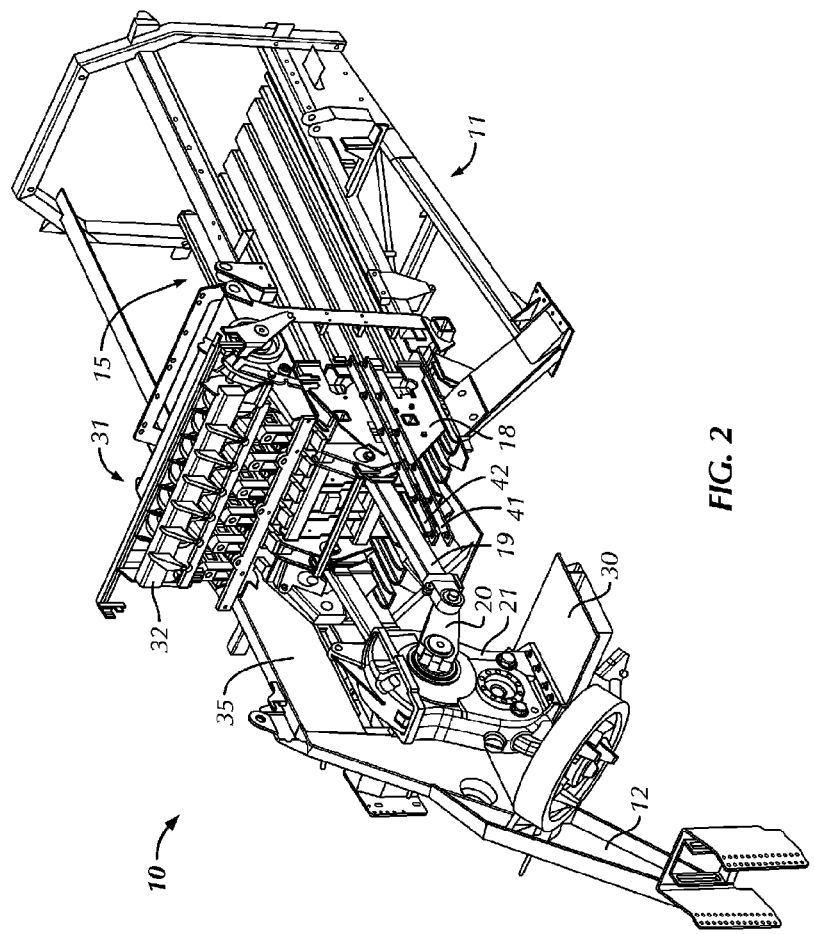
FIG. 2 is a 3D view of part of an agricultural baler in accordance with embodiments of the present invention.

Part of an agricultural baler 10 in accordance with embodiments of the present invention is illustrated in FIG. 2. The constituent parts are substantially the same as in a prior art baler, but the positioning of some of the parts is different.

The main frame 11 of the baler 10 is a part onto which all parts are mounted. This frame 11 should be manufactured with sufficient accuracy such that all parts can be perfectly mounted thereon. However, such accuracy cannot be reached easily in practice because the frame 11 of the baler 10 is a welded construction which, after finishing the welding, deforms due to tension caused by the welding.

The two most important parts in view of the present invention are the carrying beam 30 and the baling chamber 15, and more particularly the position of these two parts with respect to one another. The baling chamber 15 is that part of the baler 10 where a bale of agricultural material is formed. The dimensions of the formed bale depend on the dimensions of the baling chamber 15. One example of a baling chamber 15 is 1200×900 mm. On the carrying beam 30 of the frame 11 is mounted the gearbox 21 of the baler 10.

Figure 3:
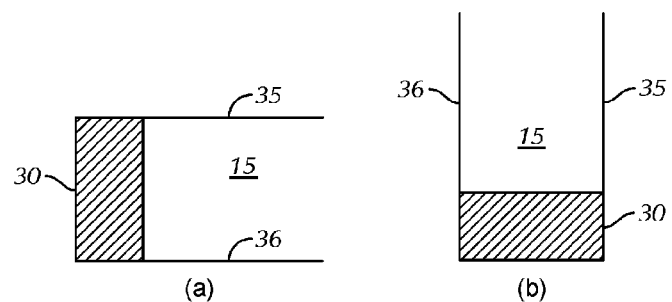
FIG. 3 is a simplified illustrative top view (a) and rear view (b) of how a baling chamber should be positioned with respect to a carrying beam carrying a gearbox for driving a plunger moving in the baling chamber.

FIG. 3 is a simplified illustrative top view (a) and rear view (b) of how the baling chamber 15 should be positioned with respect to the carrying beam 30. In the most optimal form, the baling chamber 15 is positioned in line with the carrying beam 30.

Figure 4:
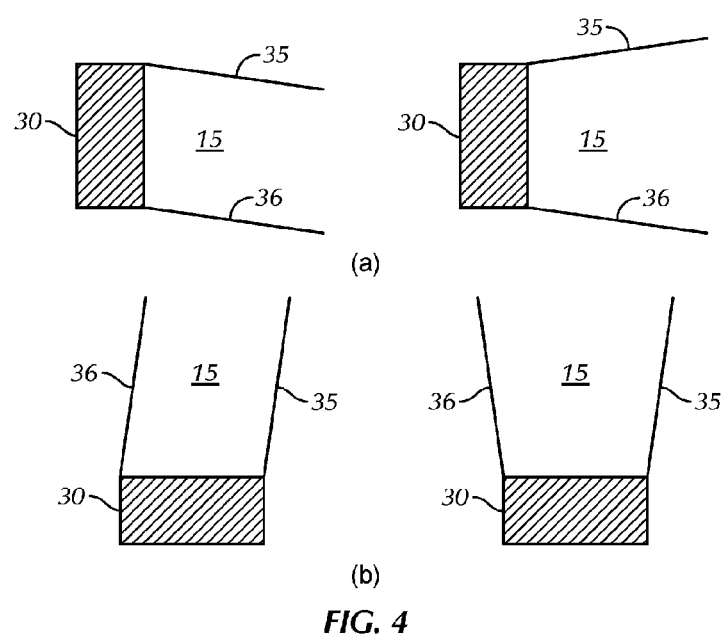
FIG. 4 illustrates possible deformations of the baling chamber with respect to the carrying beam, wherein illustrations indicated with (a) illustrate a deformed frame in top view, and illustrations indicated with (b) illustrate a deformed frame in rear view.

FIG. 4 illustrates possible deformations of the baling chamber 15 with respect to the carrying beam 30 (angles of deformation are exaggerated for teaching purposes only). Illustrations indicated with (a) in FIG. 4 illustrate a deformed frame in top view, where at the left hand side the baling chamber 15 has parallel walls but which are not placed parallel to the carrying beam 30 and at the right hand side the baling chamber 15 has walls which are not parallel with respect to one another. Illustrations indicated with (b) in FIG. 4 illustrate a deformed frame in rear view, where at the left hand side the baling chamber 15 has parallel walls but which are not placed straight in the vertical direction with respect to the carrying beam 30 and at the right hand side the baling chamber 15 has walls which are not parallel with respect to one another.

The gearbox 21 provides actuation of the actuated parts of the baler 10. It is mounted on the carrying beam 30 of the baler 10. The gearbox 21 itself may be actuated by the tractor pulling the baler 10 by means of a transmission shaft 22 between the tractor and the baler 10, as illustrated also in FIG. 1. The gearbox 21 provides a direct actuation of the plunger 18. Hereto, the plunger 18 may for example be connected to the gearbox 21 by means of crank arms 20 and pitman rods 19.

Figure 5:
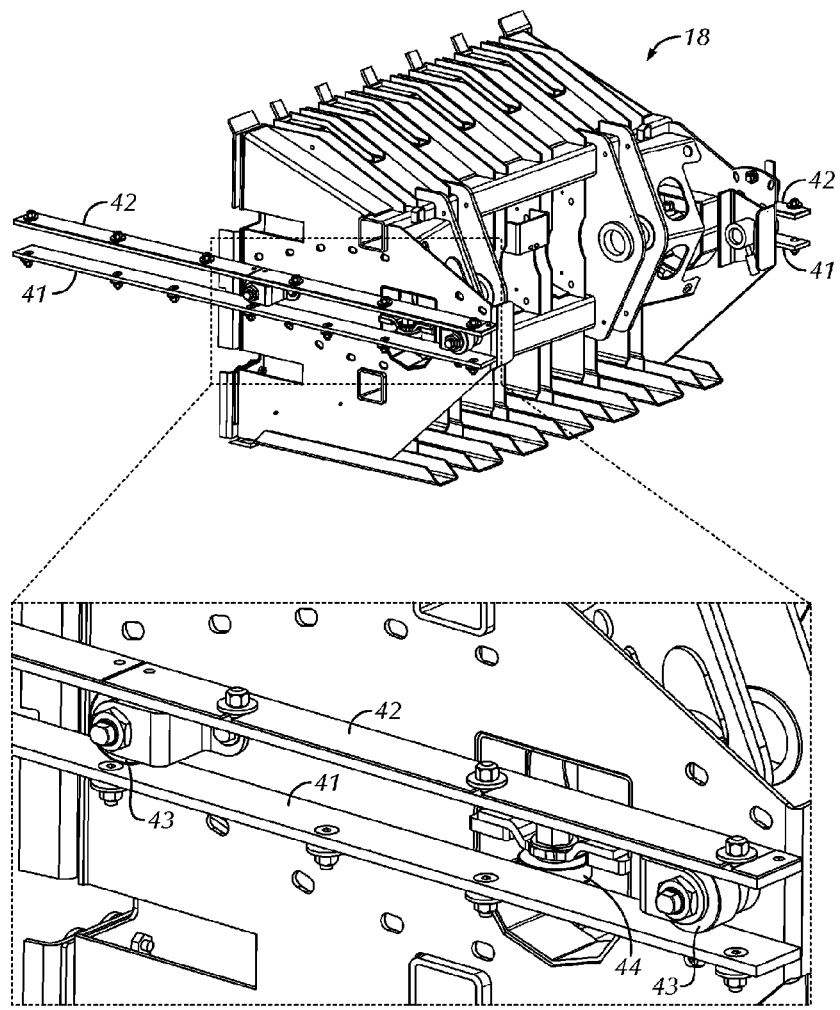
FIG. 5 illustrates a plunger for use with a baler in accordance with embodiments of the present invention.

The plunger 18 is used for forming the bales, and is illustrated in more detail in FIG. 5. The plunger 18 presses the collected crop material obtained from the charge-forming feeder duct 16 against the bale being formed in the baling chamber 15. The plunger 18 moves on and against bottom plunger rails 41 which are provided for that purpose at both sides of the baling chamber 15, at right and left hand chamber walls 35, 36. Top plunger rails 42 may optionally also be provided for forcing the movement of the plunger 18 onto the bottom plunger rails 41 and for restricting the movement of the plunger 18, thus preventing that the plunger 18 moves up and down.

In order to enable movement of the plunger 18 on and against the bottom plunger rails 41, rollers 43 are provided on the plunger 18. The rollers 43 are adapted for running on the bottom plunger rails 41. The rollers 43 ensure that the plunger 18 moves in a plane parallel to the plane generated by the bottom plunger rails 41. In order to guide the plunger 18 between the plunger rails 41, 42 at both sides of the baling chamber 15, the plunger 18 may also be provided with side rolls 44 at each side of the plunger 18. The side rolls 44 ensure that the plunger 18 always runs against a side of the plunger rails 41, 42, by default against a side of the bottom plunger rails 41.

It is a disadvantage of alignment methods of the prior art that, if the baling chamber 15 is not positioned optimally with respect to the carrying beam 30, that the plunger rails 41, which are positioned with respect to the baling chamber 15, are lying slanted with respect to the gearbox 21. This means that, when the plunger 18 moves in the baling chamber 15, friction will occur between plunger 18 and pitman rods 19, and between crank arms 20 and gearbox 21. Also it will present difficulties in adjusting the scrapers at both sides of the plunger 18.

Embodiments of the present invention provide a method for aligning a compacting plunger 18 of an agricultural square baler 10 with respect to a gearbox 21 for driving the compacting plunger 18. It is an aim of embodiments of the present invention that the plunger 18 moves in line with the gearbox 21, even if the position of the baling chamber 15 with respect to the carrying beam 30 is not theoretically correct.

A method according to embodiments of the present invention comprises controlling a position of bottom plunger rails 41 on and against which the compacting plunger 18 will move when the agricultural square baler 10 is in operation, with respect to a position of the carrying beam 30 adapted for carrying the gearbox 21. This is different from the prior art, where the position of the bottom plunger rails 41 is controlled with respect to the baling chamber 15.

Figure 6:
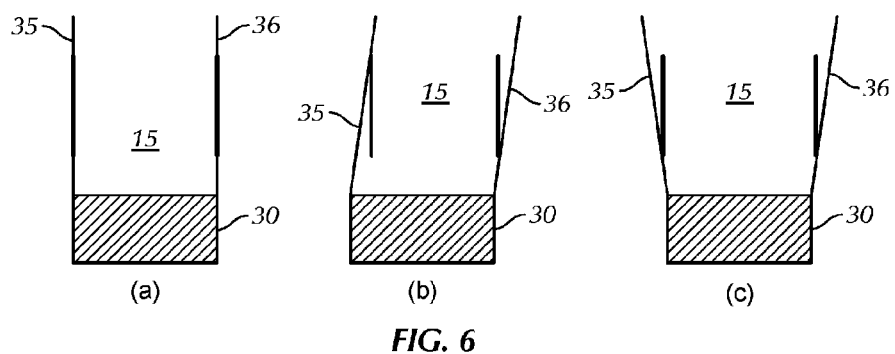
FIG. 6 is a concept drawing illustrating results of an alignment method according to embodiments of the present invention (top view).

By controlling the position of the bottom plunger rails 41 with respect to the position of the carrying beam 30 rather than with respect to the position of the baling chamber 15, the plunger rails 41 will always be in line with the gearbox 21, and friction between parts as indicated above can be drastically reduced. A concept drawing illustrating the alignment method according to embodiments of the present invention is illustrated in FIG. 6. In FIG. 6, a top view of carrying beam 30 and baling chamber 15 is shown, whereby in part (a) the theoretical optimal position of the baling chamber 15 is illustrated, and in parts (b) and (c) two deformed versions of the frame 11 (deformations exaggerated for teaching purposes only).

The baling chamber 15 of an agricultural square baler 10 has two chamber walls 35, 36 positioned opposite to one another at right and left hand sides, respectively, in rear view in longitudinal direction of the baler 10. In accordance with embodiments of the present invention, controlling a position of plunger rails 41 with respect to a position of a carrying beam 30 may comprise measuring the position of the baling chamber 15, more particularly the chamber walls 35, 36, with respect to the carrying beam 30. Hereto a relationship may be determined between the walls 35, 36 of the baling chamber 15 and the carrying beam 30. For determining this relationship, a measurement method may be used which is adapted to measure predetermined points on the walls 35, 36 of the baling chamber 15 with respect to the carrying beam 30. Thereafter, based on the measurement values of these predetermined points, a relationship is determined between the baling chamber 15 and the carrying beam 30. The measurement values are determined with respect to a system of axes on the carrying beam 30. Once the relationship between the carrying beam 30, the baling chamber 15 of the agricultural baler 10 and the locations where the bottom plunger rails 41 are to be mounted is known, rail alignment values for the bottom plunger rails 41 can be determined. The rail alignment values indicate a deviation from a position on the walls 35, 36, for controlling placement of the bottom plunger rails 41 with respect to the chamber walls 35, 36 such that they are positioned in line with a gearbox 21 to be mounted on the carrying beam 30. The determined rail alignment values may be stored in a first data storage, e.g. the rail alignment values may be written by means of a PLC onto a data carrier; and such data storage may be delivered with the baler 10. The placement of the bottom plunger rails 41 on the chamber walls 35, 36 may then be controlled in accordance with the determined rail alignment values, for example after reading the determined adjustment values from the first data storage.

The determined rail alignment values are different for each baler 10, because the deformation of the baling chamber 15 e.g. due to welding, is different for each baler 10. This means that each baler 10 has to be measured, and that for each baler 10 the relationship between the baling chamber 15 and the carrying beam 30 needs to be determined.

An alignment method according to embodiments of the present invention comprises several phases which are explained in more detail below.

Figure 7:
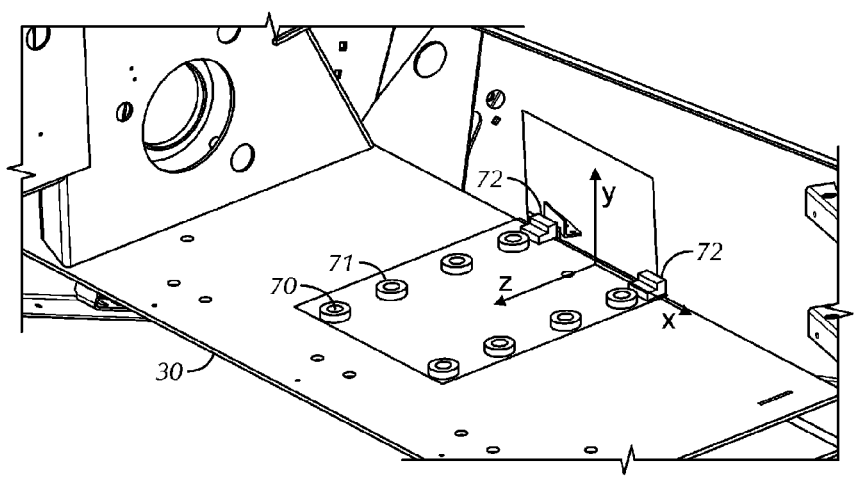
FIG. 7 illustrates a carrying beam in accordance with embodiments of the present invention.

A first phase comprises the exact measurement of the carrying beam 30 onto which the gearbox 21 will be mounted. The carrying beam 30 typically is a plate structure, as illustrated in FIG. 7, with a number of pinholes 70 with blanks 71 for attaching the gearbox 21, in the example illustrated eight. At least two, for example exactly two, positioning elements, for example L-shaped blocks 72, are mounted at that side of the carrying beam 30 located opposite the side of the baling chamber 15 to allow exact positioning of the gearbox 21.

An example of how to obtain the exact measurement of the carrying beam 30 is by mounting a highly accurately composed reference element 80 (FIG. 8) in the pinholes 70 of the carrying beam 30. The reference element 80 comprises a ground plate 81 and a wall 82 placed perpendicular to the ground plate 81. The reference element 80 is adapted such that it can be located with the ground plate 81 on the carrying beam 30 of the baler 10, such that the wall 82 stands up from the carrying beam 30 and is lying in a direction substantially parallel to the side of the carrying beam 30 located opposite the side of the baling chamber 15. The reference element 80 comprises a further upstanding element 83 which is placed both perpendicular to the ground plate 81 and to the wall 82. The upstanding parts such as the wall 82 and the upstanding element 83 may be provided with strengthening elements (not visible in FIG. 8), e.g. triangular strengthening elements for preserving their accurate position.

Figure 8:
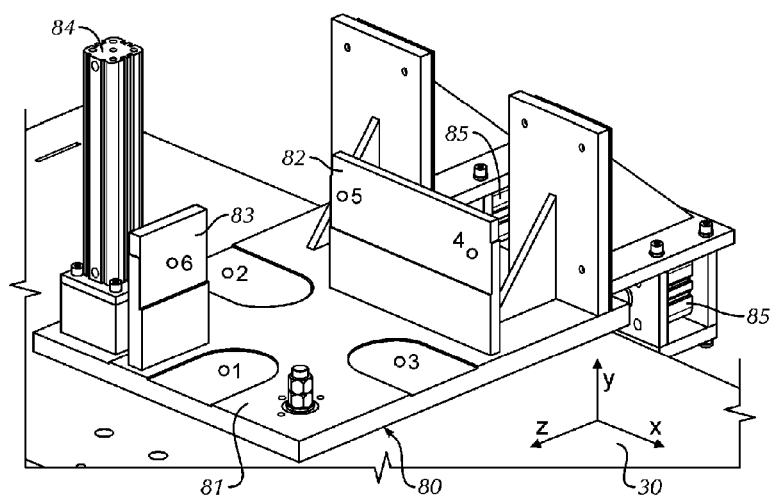
FIG. 8 illustrates a reference element for use in a method according to embodiments of the present invention.

A measurement tool will measure co-ordinates of particular predetermined points on the reference element 80 which are relevant for establishing a co-ordinate system. Examples of these particular points are indicated in FIG. 8 by numbers

1, 2, 3, 4, 5 and 6. The measurement data may be registered by any suitable device, for example a computing device.

The measurement points 1 to 3 are spots on precisely flattened places on the surface of the ground plate 81. They determine an xz-plane. Measurement points 4 and 5 are spots on the wall 82 placed perpendicular to the ground plate 81. They determine an xy-plane perpendicular to the xz-plane. Measurement point 6 is a spot on the upstanding element 83 mounted perpendicular to the ground plate 81 and the wall 82.

The reference element 80 may also comprise two horizontal cylinders 85 for pulling the reference element 80 against the positioning elements, e.g. the L-shaped blocks 72, of the carrying beam 30. This way, the reference element 80 may take on an optimal position on the carrying beam 30. Also a vertical cylinder 84 may be provided, for avoiding tilting of the reference element 80 under influence of the pressure exerted by the horizontal cylinders 85 when pulling the reference element 80 against the carrying beam 30.

The measurement tool used for measuring co-ordinates of particular predetermined points on the reference element 80 can be any suitable measurement tool; it can for example be a measurement robot, a coordinate-measuring machine or a firm measuring device, for example fixed on the carrying beam 30 of the baler 10. In a particularly advantageous embodiment, illustrated in FIG. 9, a measurement robot 90 is used for measuring. The measurement robot 90 has the advantage over a coordinate-measuring machine that it is cheaper and better for handling large objects. The horizontal bars 91 and 92 of the baling chamber 15 are obstacles that can more easily be avoided by a measurement robot 90 than by a coordinate-measuring device. The advantages of a measurement robot 90 over a firm measuring device fixed on the carrying beam 30 are that the robot 90 works with a probe and not with a (laser) light sensor that can be affected by the welding light. Moreover, the robot 90 will be easier to handle than such firm device which has to be big. The robot 90 is mounted on a rotatable arm 93 for optimal accessibility of the desired measurement points.

An optional second phase may comprise determining a virtual midplane of the carrying beam 30. This may be done by means of the computer that registers the measurement data. Since this beam 30 or the pinholes 70 and blanks 71 might not be completely aligned with the rest of the frame 11, a virtual midplane may be mentioned.

In a third phase the axes are determined. The axes are defined by the location of the measurement points as illustrated in FIG. 8. For example points 1 to 3 can determine a first plane, points 4 and 5 can determine a second plane perpendicular to the first plane and point 6 can determine the position of a third plane perpendicular to the first and the second plane. A transformation matrix is made up as required between the coordinate system of the measurement tool, e.g. measurement robot 90, and the determined coordinate system on the reference element.

Figure 9:
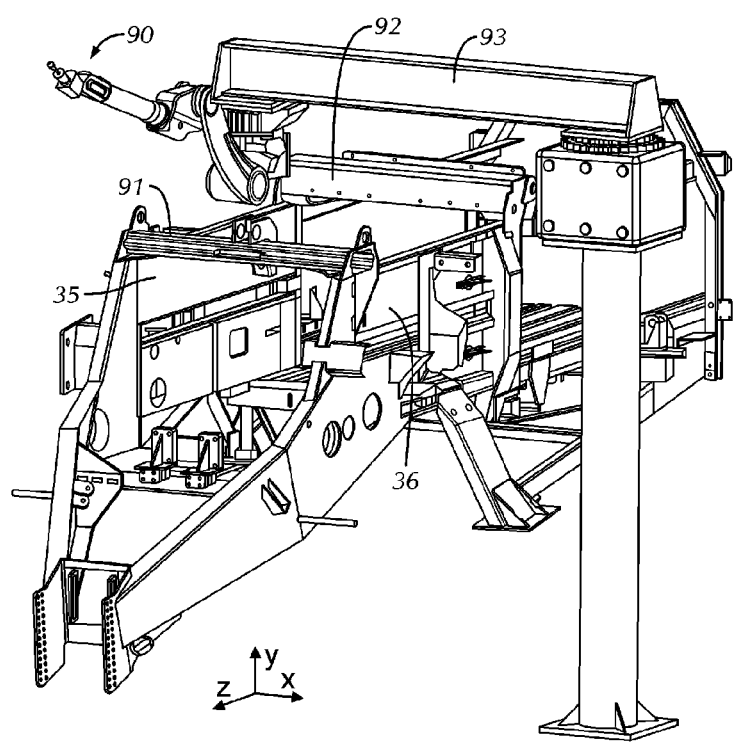
FIG. 9 illustrates the use of a measurement robot for determining measurement values in accordance with embodiments of the present invention.

In a fourth phase the measurement tool, e.g. measurement robot 90, as for example illustrated in FIG. 9, will measure the position of the chamber walls 35, 36 of the baling chamber 15. Hereto, co-ordinates of a plurality of chamber measurement points on both chamber walls 35, 36 are determined.

Figure 10:
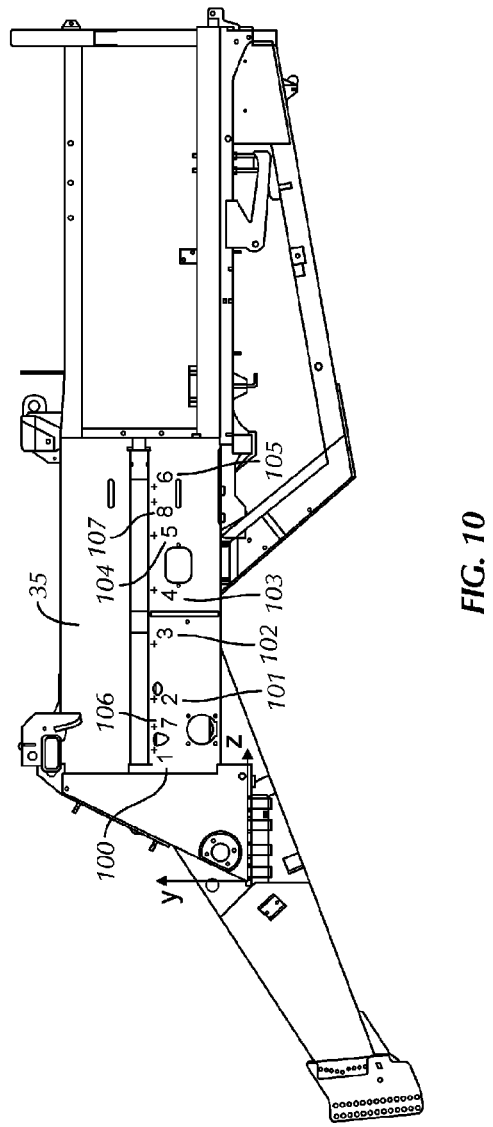
FIG. 10 and FIG. 11 illustrate exemplary locations of chamber measurement points in accordance with embodiments of the present invention on chamber walls of a baling chamber.
Figure 11:
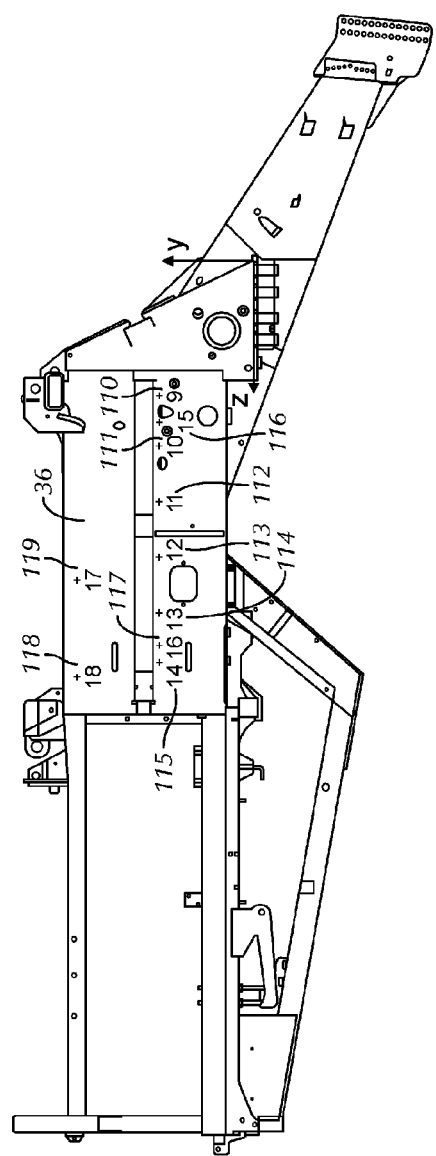

As an example, chamber measurement points on chamber wall 35 are illustrated in FIG. 10 and chamber measurement points on chamber wall 36 are illustrated in FIG. 11. The co-ordinates of a plurality of chamber measurement points, in the embodiment illustrated in FIG. 10 and FIG. 11 six chamber measurement points 100, 101, 102, 103, 104, 105 and 110, 111, 112, 113, 114, 115, respectively, are measured for determining the shape of the chamber walls 35, 36 in the neighborhood of the location where the bottom plunger rails 41 are to be fixed. Furthermore, on each chamber wall 35, 36 co-ordinates of two more measurement points 106, 107 and 116, 117, respectively, are determined for use during the actual adjustment of the plunger rails 41.

In a fifth phase, based on the measurement values, more particularly based on the measured co-ordinates of the measurement points on chamber walls 35, 36, rail alignment values for the positioning of the plunger rails 41 may be determined.

As mentioned above, it is an object of the present invention to control the positioning of the bottom plunger rails 41 so that they are lying in line with the gearbox 21. This means that the position of the plunger rails 41 is to be adjusted so that they are parallel to the yz-plane of coordinate system as illustrated in FIG. 7. The distance between the plunger rails 41 and the yz-plane depends on the measurement values, hence depends on the actual geometry of the baler 10 under consideration. When controlling the position of the plunger rails 41, it has to be made sure that the distance between the plunger rails 41 and the yz-plane is not larger than the smallest measurement value for measurement points 100, 101, 102, 103, 104, 105 and 110, 111, 112, 113, 114, 115 for determining the shape of the respective chamber walls 35, 36. If the smallest measurement value would not be taken into account, a chance exists that the side rolls 44 run against a chamber wall 35, 36 rather than against a plunger rail 41, leading to wear of the chamber wall 35, 36.

Figure 12:
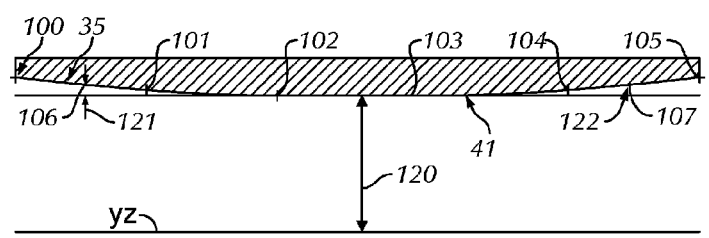
FIG. 12 illustrates the determination of rail alignment values in accordance with embodiments of the present invention.

An example of a chamber wall 35 and its measurement points 100, 101, 102, 103, 104, 105 for determining the shape of the chamber wall 35 is illustrated in FIG. 12. It can be seen that in this example measurement value 103 has the smallest value, as indicated by 120.

As measuring and adjusting happen at two distinct moments in time and at two distinct places, measuring being done before assembly and adjusting being done during assembly, during controlling of the positioning of the plunger rails 41 (assembly) measurements cannot be performed on the plunger rails 41 themselves. Therefore, rail alignment values need to be determined. These rail alignment values will be used for placing the plunger rails 41 parallel to the yz-plane by using the chamber walls 35, 36 of the baling chamber 15.

Figure 13:
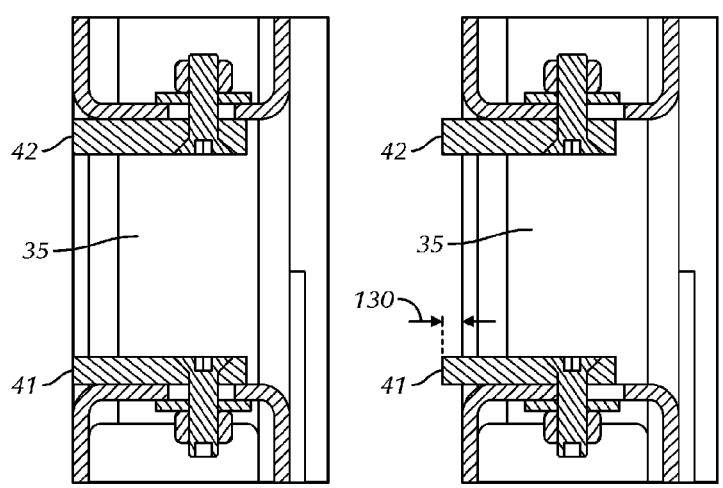
FIG. 13 illustrates the maximum distance a plunger rail can shift with respect to a chamber wall.

In first instance, one may determine whether the difference between the smallest and the largest measurement value for determining the shape of a particular chamber wall 35, 36 is not larger than a pre-determined value 130, which is defined by the maximum distance the plunger rail 41 can shift with respect to the chamber wall 35, 36 onto which it is attached. This maximum distance may for example be not larger than 7 mm. Such a predetermined distance 130 is illustrated in FIG. 13. If the difference between the smallest and the largest measurement value is larger than the pre-determined value 130, no alignment in accordance with embodiments of the present invention will be possible. If, however, this is not the case, an alignment procedure may be carried out. In particular embodiments of the present invention (not illustrated in FIG. 13), the top plunger rail 42 is fixed and cannot be adjusted. However, in alternative embodiments, as illustrated in FIG. 13, also the top plunger rail 42 may be shifted over approximately a same distance as the bottom plunger rail 41, in the embodiment illustrated over the pre-determined value 130. This, however, is not required; both plunger rails 41, 42 on a same chamber wall 35, 36 could be shifted over (slightly) different distances, as the top plunger rails 42 will not necessarily be used for having side rolls 42 running against them. If the top plunger rails 42 are not used for having side rolls 42 running against them, their positioning is less critical. If top plunger rails 42 would be used for having side rolls 42 running against them, they should be very accurately positioned as well. The optional adjustment of the top plunger rails 42 requires an additional adjustment.

In second instance, a distance value is determined at which the bottom plunger rail 41 will be placed. With "at which the plunger rail 41 will be placed" is meant that that side of the plunger rail 41 against which the side rolls are to run is placed at that distance. It is a distance value (distance from the yz-plane) not larger than the smallest measurement value.

In third instance, once the distance value is known, rail alignment values are determined. These rail alignment values are values which will be applied to alignment devices, and which correspond to the difference between the distance value at which the plunger rail 41 will be placed and a corresponding measurement point on the chamber wall 35, 36. In the embodiment illustrated in FIG. 10 and FIG. 11, two measurement points 106, 107 and 116, 117 were determined on each chamber wall 35, 36 for use during actual adjustment of the plunger rails 41. The rail alignment values determined in this case correspond to the difference between the measurement values of these measurement points 106, 107, 116, 117 and the distance value towards which the plunger rail 41 is to be controlled. The rail alignment values for the exemplary chamber wall 35 as illustrated in FIG. 12 are indicated with 121, 122.

Figure 14:
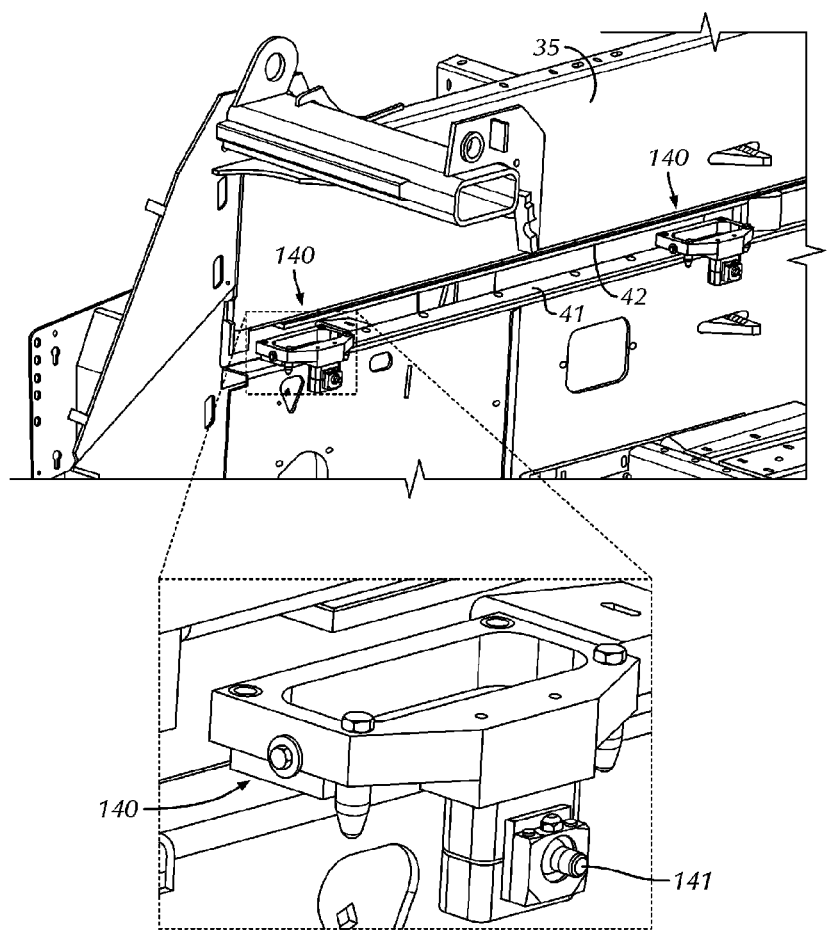
FIG. 14 illustrates control devices attached to a plunger rail for alignment thereof with a gearbox driving a plunger moving on and against that plunger rail in accordance with embodiments of the present invention.
Figure 15:
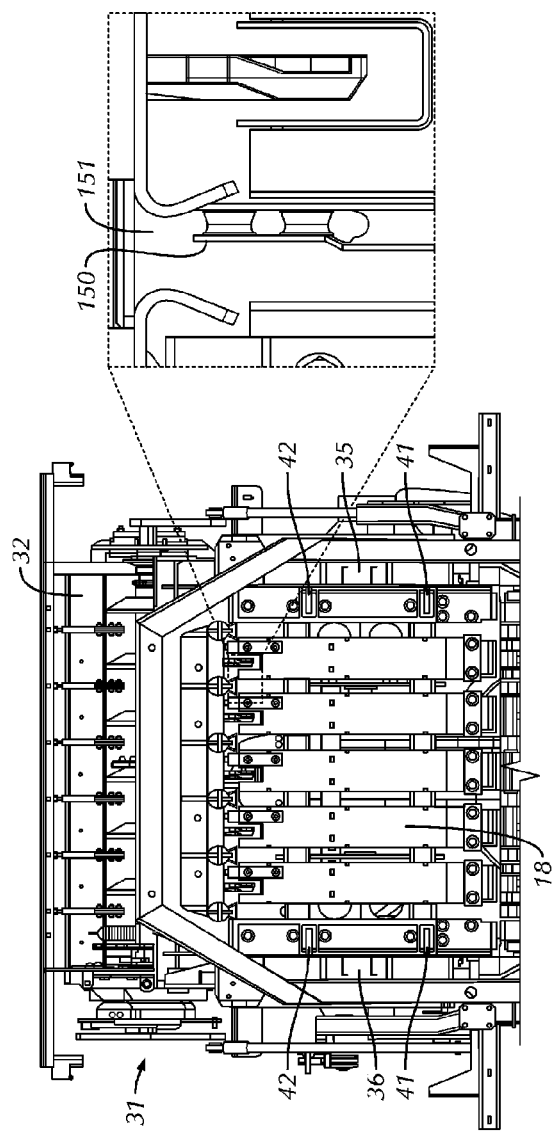
FIG. 15 illustrates knotter system and needle passages in accordance with embodiments of the present invention.

In a sixth phase, the determined rail alignment values may be used in accordance with embodiments of the present invention for aligning the plunger rails 41. In particular embodiments, such alignment may be carried out in an automated way. Hereto, at least one control device 140 may be attached to the plunger rail 41 to be aligned, as illustrated in FIG. 14.

A control device 140 may comprise a distance sensor 141, for determining the distance between the side of the plunger rail 41 against which side rolls of the plunger 18 will roll and the chamber wall 35, 36 at the location of the measurement point 106, 107, 116, 117. In particular embodiments, the distance sensor 141 may be a contactless distance sensor. Several sensors can be used for the adjustment, for example an inductive sensor, a capacitive sensor, a laser light sensor or an ultrasonic sensor. It is particularly advantageous to use an inductive sensor, as this type of sensor is not influenced by external factors as welding light, surrounding noise or nearby metals.

A sensing face of the distance sensor 141 is placed against that side of the plunger rail 41 to be adjusted against which side rolls 44 will run, or a pre-determined distance away therefrom, towards the centre of the baling chamber 15 (yz-plane). If the sensing face is located a pre-determined distance away from the side of the plunger rail 41 against which side rolls 44 will run, this pre-determined distance is to be taken into account during alignment of the plunger rail 41.

The control device 140 may also comprise a movement device, such as for example a lever system, for moving the position of the plunger rail 41 with respect to the chamber wall 35, 36 in accordance with a particular determined rail alignment value, and optionally (depending on the position of the sensing face of the distance sensor 141) also taking into account the distance between the sensing face and the side of the plunger rail 41 against which the side rolls 44 will run. Alternatively, the adjustment of the position of the plunger rail 41 with respect to the chamber wall 35, 36 may be performed manually. The distance sensor 141 can measure the distance to the chamber wall 35, 36. The position of the plunger rail 41 can be adapted by means of the movement device until the distance between the side of the plunger rail 41 against which the side rolls will run and the chamber wall 35, 36 corresponds with the rail alignment value as calculated in phase five.

In particular embodiments, two control devices 140 are provided on a plunger rail 41, one at each end thereof, at a location corresponding to the measurement points 106, 107, 116, 117 for adjustment of the plunger rails 41.

In an optional seventh phase, the determined rail alignment values may be stored in a data storage, for example using RFID (Radio Frequency Identification). The data storage may be used to transfer data to the control device 140. The data storage, e.g. an RFID chip, can be attached to the baler 10 to make sure that the right data remains with the right machine.

Not only the determined rail alignment values may be stored in a data storage; but after performing the alignment of the bottom plunger rail 41, the actually used rail alignment values may be measured, and these measured rail alignment values may also be stored in a data storage.

Advantageously the data storages for storing the determined rail alignment values and the measured rail alignment values may be one and the same data storage.

In use, a baler 10 according to embodiments of the present invention comprises a measuring device for measuring the length of a formed bale. Once a predetermined bale length is reached, and before leaving the confines of the baler 10, each bale is securely bound in its final compacted form by a tying mechanism 31 as illustrated in FIG. 2. The length of each bale produced by the baler can be adjustably predetermined by conventional means not shown and not explained in more detail.

The tying mechanism 31 comprises a series of periodically actuated needles 150 which are normally stationed in a standby condition below the chamber 15 but which, when actuated, swing upwardly through and across the baling chamber 15 to present twine to a corresponding series of knotters of a knotter system 32 positioned on top of the chamber 15 and extending across the width of the latter.

When swinging upwardly, the needles 150 move through slits in the plunger 18 towards the knotter system 32. Once the knotter system 32 is reached, the needles 150 will move against a side of the needle passage 151, in the example illustrated against the right hand side of the needle passage 151. When contacting the side of the needle passage 151, the needle 150 does not vibrate. This illustrates the need of accuracy in positioning between the needles and the knotter system 32, because if the needles 150 would enter the knotter system 32 while vibrating, this could cause errors in knotting.

In accordance with embodiments of the present invention, in an eighth phase, the knotter system 32 may be mounted aligned with the carrying beam 30 rather than aligned with the plunger 18 as is the case in the state of the art. In accordance with embodiments of the present invention, knotter alignment values are determined so as to align the knotter system 32 with the carrying beam 30 such that a plane of the knotter system 32 that should coincide with a vertical center plane of the gearbox 21 effectively does so. When aligning the knotter system 32, the position of the knotter system with respect to the fictive yz-plane will be the same for different balers 10; however, the position of the knotter system 32 with respect to the chamber walls 35, 36 may be different for different balers 10 as the position of these chamber walls 35, 36 may be different for different balers 10.

In accordance with embodiments of the present invention, once the rail alignment values for the plunger rails 41 are known, knotter alignment values for the knotter system 32 can be determined. For aligning the knotter system 32, use is made of one of the chamber walls 35, 36 of the baler 10, for example the left chamber wall 36.

Use is made of a plurality of distance sensors, for example two sensors 160, 161, of which the position of the center point with respect to the coordinate system as illustrated in FIG. 7 is known.

When determining the knotter alignment values for alignment of the knotter system 32, distances are determined between the center of the sensors 160, 161 and the chamber wall 36, in order to make sure that the plane of the knotter system that should theoretically coincide with the yz-plane effectively does so. In order to realize this, the distance between the sensors 160, 161 and the chamber wall 36 needs to be determined.

As illustrated in FIG. 11, two supplementary measurement points 118, 119 for adjustment of the knotter system 32 are provided. The y- and z-coordinates of these supplementary measurement points 118, 119 coincide with the y- and z-coordinates of the centers of the sensors 160, 161.

If a difference is calculated between the x-coordinate of a supplementary measurement point 118, 119, and the theoretical x-coordinate where an edge of the knotter system 32 should lie with respect to the yz-plane, the absolute value of this difference corresponds to the alignment value to be used for aligning the knotter system 32. This knotter alignment value can be accurately measured by means of the sensors 160, 161 when aligning the knotter system 32.

Figure 16:
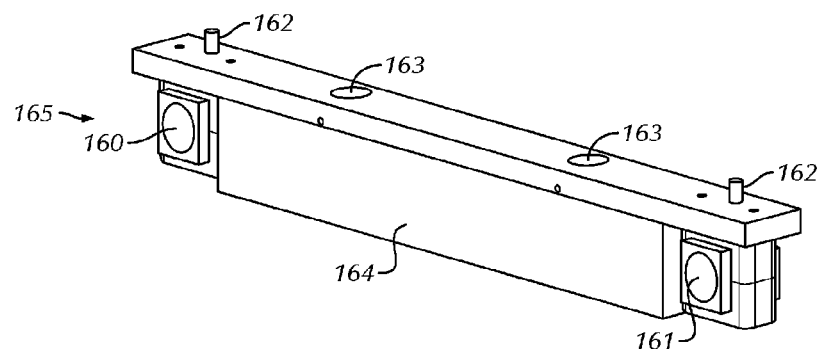
FIG. 16 illustrates an alignment device for aligning a knotter system with the carrying beam in accordance with embodiments of the present invention.
Figure 17:
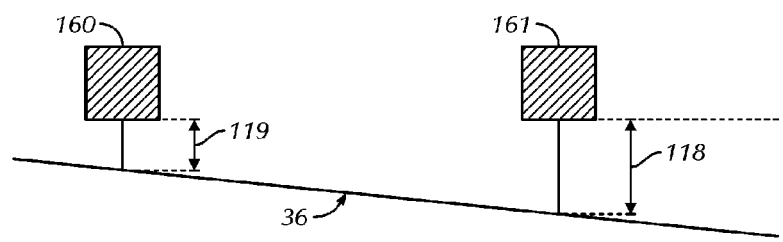
FIG. 17 illustrates the determination of knotter alignment values in accordance with embodiments of the present invention.

Hereto, an alignment device 165 is provided, as illustrated in FIG. 16, comprising a body 164 to which the two sensors 160, 161 are attached. The alignment device 165 is attached at a pre-determined location at the bottom of the knotter system 32, for example by means of positioning means such as pins 162 fitting in corresponding holes (not illustrated) in the knotter system 32, and attachment means such as magnets 163 for providing the actual attachment from the alignment device 165 to the knotter system 32. In the example illustrated both the pins 162 and the magnets 163 are provided in the alignment device 165. This, however, is not intended to be limiting. The pins and/or the magnets could be provided on or in the knotter system 32. In alternative embodiments, other positioning means than pins could be used, and/or also other attachment means than magnets could be used.

The alignment device 165 may also comprise a movement device for moving the position of the knotter system 32 with respect to the chamber wall 36 in accordance with a particular determined knotter alignment value, and optionally (depending on the position of the sensing face of the sensors 160, 161) also taking into account the distance between the sensing face and the chamber wall 36. Alternatively, the alignment may be performed manually. A lifting device may be used to support the weight of the knotter system. The position of the knotter system 32 can be adapted manually or by means of the movement device until the distance between the side of the knotter system 32 and the chamber wall 36 corresponds with the knotter alignment value as calculated above.

In particular embodiments, two sensors 160, 161 are provided on an alignment device 165, one at each end thereof, at a location corresponding to the measurement points 118, 119 for adjustment of the knotter system 32.

In an optional ninth phase, the determined knotter alignment values may be stored in a data storage, for example using RFID (Radio Frequency Identification). The data storage may be used to transfer data to the alignment device 165, more particularly to the movement device thereo. The data storage, e.g. an RFID chip, can be attached to the baler 10 to make sure that the right data remains with the right machine.

Not only the determined knotter alignment values may be stored in a data storage; but after performing the alignment, the actually used knotter alignment values may be measured, and these measured knotter alignment values may also be stored in a data storage.

Advantageously the data storages for storing the determined knotter alignment values and the measured knotter alignment values may be one and the same data storage. More advantageously this latter data storage is the same as the data storage used for storing determined and/or measured alignment values for aligning the plunger rails.

A method according to embodiments of the present invention, for example as described above, may be used of aligning a compacting plunger 18 of an agricultural square baler 10 with respect to a gearbox 21 for driving the compacting plunger 18.

In another aspect, the present invention provides an agricultural baler comprising a frame 11 comprising a carrying beam 30 for carrying a gearbox 21, a pick-up assembly 13 for picking up crop material from a field, a baling chamber 15 for receiving crop material from said pick-up assembly 13, the baling chamber 15 comprising two chamber walls 35, 36 which are mounted on the frame 11, and a compacting plunger 18 mounted for reciprocating movement in said baling chamber 15 for compression of the crop material therein. The plunger 18 is adapted for being driven by a gearbox 21 affixed to said carrying beam 30, said compacting plunger 18 being adapted for moving on and against plunger rails 41 attached to the chamber walls 35, 36. In accordance with embodiments of the present invention, the plunger rails 41 are attached to the chamber walls 35, 36 in a controlled position with respect to the carrying beam 30 such that the plunger 18 is adapted to move aligned with respect to the gearbox 21.

While the invention has been illustrated and described in detail in the drawings and foregoing description, such illustration and description are to be considered illustrative or exemplary and not restrictive. The invention is not limited to the disclosed embodiments.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

What is claimed is:

1. A method for aligning plunger rails for a compacting plunger of an agricultural square baler, the method comprising
providing a baling chamber and a carrying beam;
providing plunger rails;

aligning a position of the plunger rails with respect to a position of the carrying beam adapted for carrying a gearbox; and placing the plunger rails on walls of the baling chamber in the aligned position so said plunger rails are aligned with said carrying beam regardless of an orientation of said walls of said baling chamber with respect to said carrying beam.

2. A method for positioning plunger rails for a compacting plunger of an agricultural square baler, the method comprising controlling a position of plunger rails on and against which the compacting plunger is placed, with respect to a position of a carrying beam configured for carrying a gearbox;

wherein the agricultural square baler comprises a baling chamber for receiving crop material and for having crop material compressed therein, the baling chamber having two chamber walls, wherein controlling a position of plunger rails with respect to a position of a carrying beam comprises measuring the position of the baling chamber with respect to the carrying beam, and determining rail alignment values for controlling placement of the plunger rails with respect to the chamber walls such that the plunger rails are positioned in line with a gearbox mounting position of the carrying beam onto which the gearbox is mounted or will be mounted regardless of an orientation of said chamber walls with respect to said carrying beam; and positioning said plunger rails in line with said gearbox mounting position.

3. A method according to claim 2, furthermore comprising storing the determined rail alignment values in a first data storage.

4. A method according to claim 3, wherein controlling placement of the plunger rails in accordance with the determined rail alignment values includes reading the determined rail alignment values from the first data storage.

5. A method according to claim 2, wherein controlling the placement of the plunger rails includes making use of at least one sensor device to determine a distance between the rail and at least one wall of the chamber.

6. A method according to claim 2, further comprising, after placement of the plunger rails, determining rail measurement values corresponding to the actual location of the plunger rails with respect to the chamber walls.

7. A method for assembling an agricultural square baler with a compacting plunger and a gearbox for driving the compacting plunger, the method comprising controlling a position of plunger rails on and against which the compacting plunger is placed, with respect to a position of a carrying beam configured for carrying the gearbox; and controlling a position of a knotter system with respect to a position of the carrying beam configured for carrying the gearbox; and wherein controlling a position of a knotter system with respect to a position of the carrying beam comprises measuring a position of a baling chamber with respect to the carrying beam, and determining knotter alignment values for controlling placement of the knotter system with respect to chamber walls of the baling chamber such that the knotter system is positioned in line with the position of the carrying beam configured for carrying the gearbox regardless of an orientation of said plunger with respect to said carrying beam; and positioning the knotter system in line with the position of the carrying beam configured for carrying the gearbox.

8. A method according to claim 7, wherein the knotter system of an agricultural square baler is aligned with respect to the gearbox for driving a compacting plunger of that baler.

* * * * *